Dec. 25, 1962      H. J. H. GOOSSENS      3,070,113
PRESSURE REGULATING DEVICE FOR OIL BURNERS
Filed July 7, 1959      4 Sheets-Sheet 1
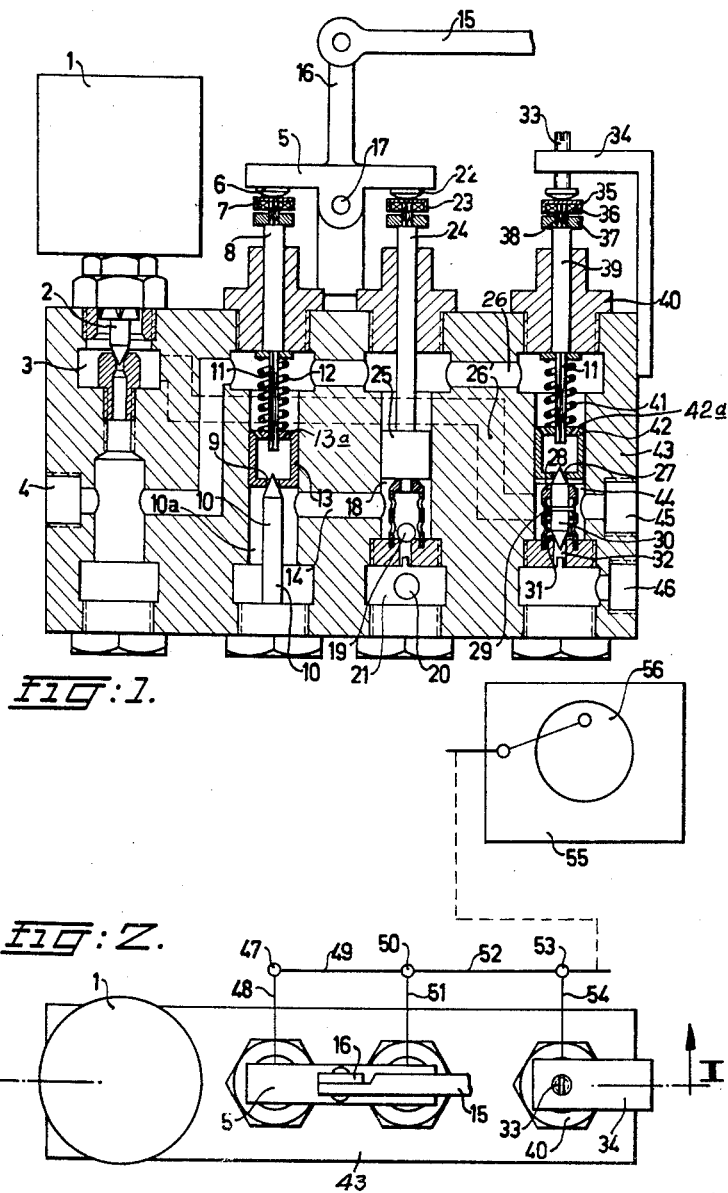
HENRI J.H. GOOSSENS
INVENTOR.

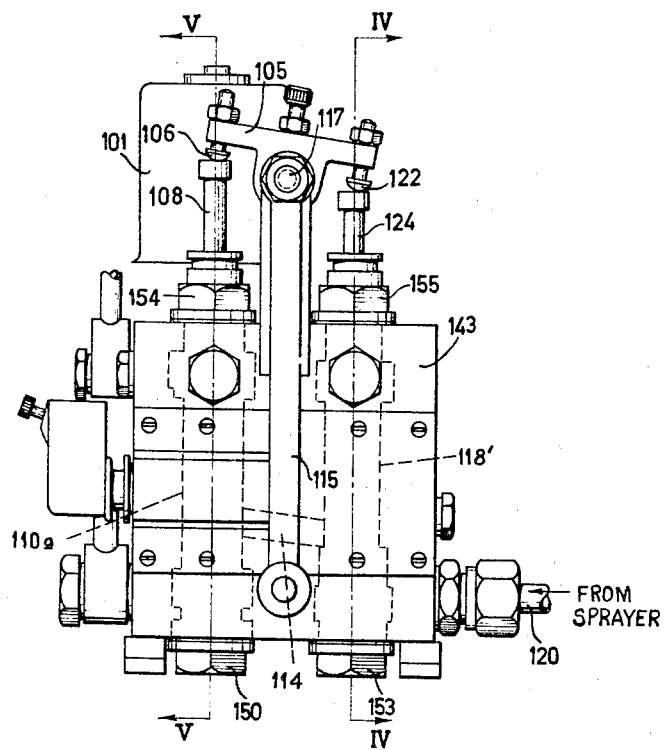

Dec. 25, 1962  H. J. H. GOOSSENS  3,070,113
PRESSURE REGULATING DEVICE FOR OIL BURNERS
Filed July 7, 1959  4 Sheets-Sheet 3
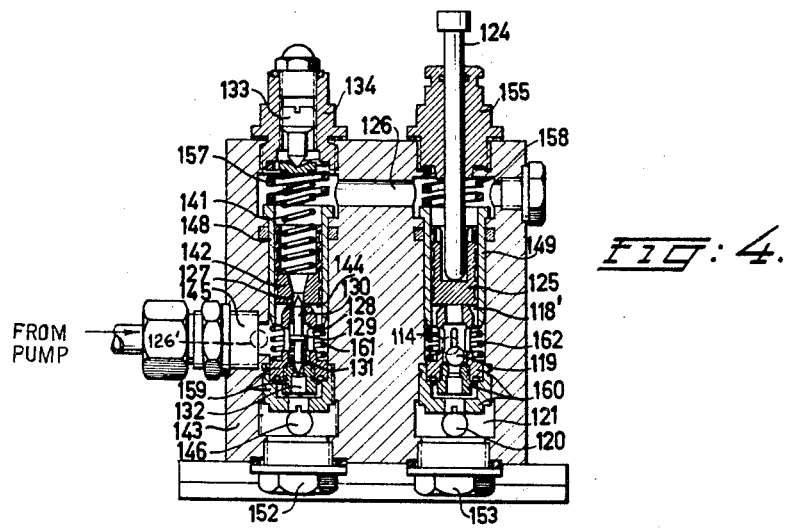
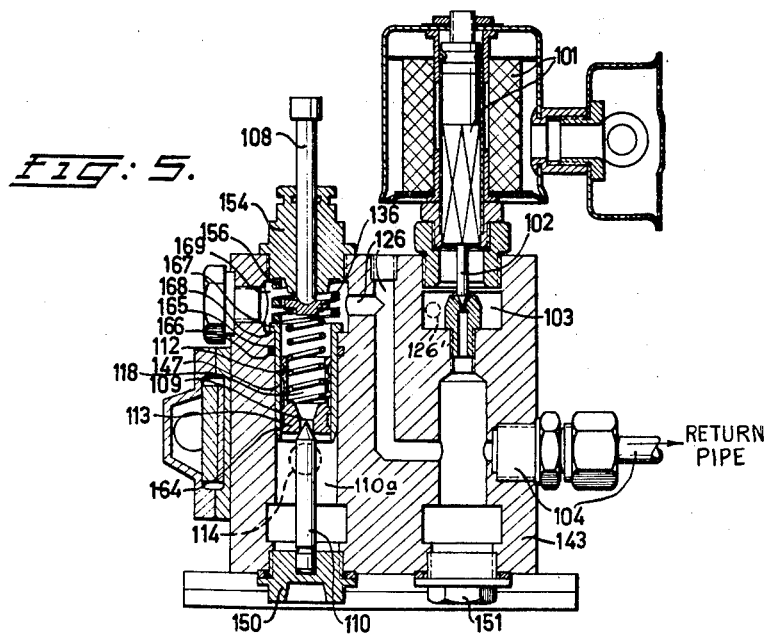
HENRI J. H. GOOSSENS
INVENTOR.
BY
ATTORNEY Dec. 25, 1962

H. J. H. GOOSSENS 3,070,113

PRESSURE REGULATING DEVICE FOR OIL BURNERS

Filed July 7, 1959

INVENTOR
HENRI J.H. GOOSSENS

BY

ATTORNEY

United States Patent Office 3,070,113
Patented Dec. 25, 1962

3,070,113
PRESSURE REGULATING DEVICE FOR
OIL BURNERS
Henri J. H. Goossens, The Hague, Netherlands, assignor to Stookunie N.V., Delft, Netherlands, a Dutch limited-liability company
Filed July 7, 1959, Ser. No. 825,539
Claims priority, application Netherlands July 9, 1958
9 Claims. (Cl. 137—116)

This invention has particular reference to pressure regulating devices for oilburners, wherein two different oil pressures are controlled by spring loaded pistons in valve chambers.

In such oilburners for example according to the so-called Peabody-system, not only the oil flowing to the place where it is sprayed is held at a certain pressure but also the oil, flowing back from this place is adjusted at a lower pressure. As the quantity of oil, leaving the sprayer is dependent on the difference between the pressure at which the supply oil is set and the pressure at which the return oil is adjusted, the size of the flame can be regulated by alteration of the pressure of the returning oil at some easily accessible place in the oil circuit away from the burner nozzle.

The regulation of the above mentioned oil pressure often occurs by means of overflow valves, comprising a spring loaded piston adapted to keep an orifice in the oil circuit closed until the pressure of the oil overcomes the power of this spring. The orifice is then freed to such an extent that the oil pressure balances the pressure of the spring. For the regulation of the return oil pressure of Peabody sprayers the spring tension is manually or automatically adjusted if another flame size is desired.

It is an object of the present invention to obtain a simple and compact construction of the regulating devices concerned whereby free floating piping in the regulator part of the oil circuit is avoided and whereby cost is reduced and material saved and moreover a gain in reliability of operation is achieved.

It is a further object of the invention to make use of such compact arrangement of adjusting valves by combining certain operating means for the different valves and as a result to introduce new means increasing the reliability of operation of the valves. In the general line of these principal objects several advantageous features of construction and arrangement of parts have been incorporated to obtain economic manufacture and safety, and to facilitate assembly with a minimum of machining of parts. Reduced cost of industrial production and of maintenance is obtained by an easy interchangeability of as many parts as possible.

Safety is enhanced by the application of means to avoid sticking of the pistons, owing to certain admixtures of the fuel, which often occurs with pistons of oil regulating valves.

Automatic adjustment is improved by coupling in balance pistons exposed to the same oil pressures. The load on the driving motor is thereby relieved.

Further objects of the invention and the means by which they are obtained will follow from the description given hereinafter with reference to the accompanying drawings which illustrate an embodiment of a pressure regulating device, and wherein:

FIGURE 1 is a section along the line I—I on FIGURE 2 of a regulating block according to the invention wherein the bores providing for the valve chambers are arranged in one plane.

FIGURE 2 shows a plan view of the regulating block, the driving gear of the oscillating rotation of the piston being schematically represented.

FIGURE 3 shows in outline a side elevation of a modification of the pressure regulating device shown in FIGURES 1 and 2, the valve chambers being arranged in a quadrangle.

FIGURE 4 is a section of the regulating block taken along the line IV—IV of FIGURE 3.

FIGURE 5 is a section on the line V—V of FIGURE 3.

Figure 6:
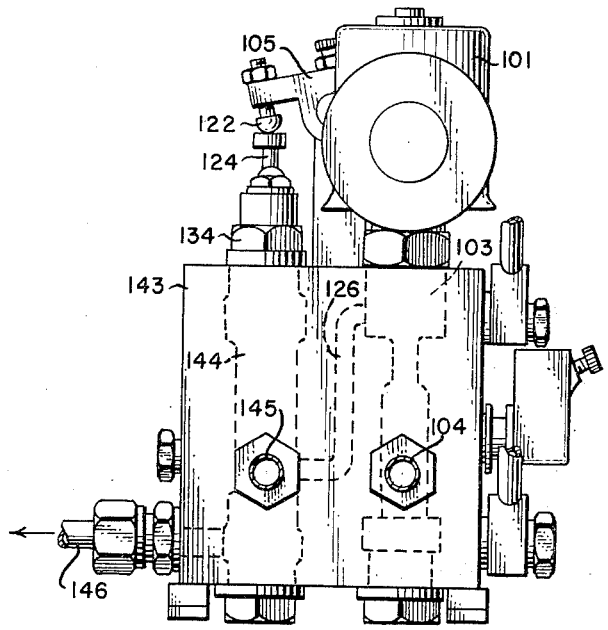
FIGURE 6 is a side elevation of the device of FIGURE 3, but as viewed from the opposite side.

In order to indicate the correspondence between the embodiment of FIGURES 1 and 2 and the embodiment of FIGURES 3-7, the reference numbers of FIGURES 1 and 2 are employed in connection with the corresponding parts in FIGURES 3-7 with the number 100 added thereto.

It can immediately be seen from the figures, that the piping between valve chambers in individual housings as used in the known art has been replaced by bores constituting canals and chambers in a single, solid, massive block of metal 43, 143.

Referring to FIG. 1, it will be seen that oil from a pump enters a chamber 44 in the block 43 at the inlet 45. From the chamber 44 the oil can flow through a by-pass or short circuit conduit 26' (indicated by dotted lines) and the chamber 3 to a return pipe 4 when the valve 2 has been lifted or unseated by an electromagnet 1.

This electromagnet 1 is a part of the electric control system and it is energized so that the valve 2 is held open until operation of the oil pump and the ignition of the burner have commenced.

If the valve 2 is closed, pressure is built up in chamber 44 until this pressure is sufficient to lift up a piston 42 therein against the action of a spring 41. A double needle valve 30 is lifted at the same time by the spring 31 until a shoulder 29 on this valve is arrested by a stop 28. The lifting of valve 30 uncovers an aperture 32 so that the oil can flow therethrough into a conduit 46 leading to the sprayer (not shown).

At a slightly higher pressure the piston 42 moves upwardly away from the upper end of arrested valve 30 so that an aperture 27 in piston 42 is freed whereby oil can flow through the piston and through a conduit 26 extending to the return pipe 4. The aperture 27 is thus opened to such an extent that the oil pressure under the piston 42 balances the pressure of spring 41.

The oil returning from the sprayer enters a chamber 21 through an aperture 20 and goes through a check valve 19 into a valve chamber 18 and continues from the latter through a conduit 14 into a valve chamber 10a. The upper end of chamber 10a also communicates with conduit 26 and a piston 13 loaded by a spring 12 and having an aperture 9 is movable in chamber 10a between conduits 14 and 26. The aperture 9 in the said piston is freed when it is moved away by the oil pressure from a fixed needle valve 10. The oil streaming through the aperture 9 also flows through the conduit 26 to the return pipe 4.

The adjustment of the oil pressure in the chamber 44 capable of lifting up the piston 42, is effected by means of an adjusting screw 33 extending through a bracket 34 fixedly connected with the block 43. This screw 33 presses by means of its rounded lower head upon a cap 35 resting upon the outer ring of a ball bearing 36, the latter transmitting the pressure via the boss 37 of an arm 54 (see FIGURE 2) to the upper end of a shaft or piston rod 39 from which arm 54 extends radially. The rod 39 extends slidably through a bushing 40 into chamber 44 of the block 43. By screwing the set screws 33 inwardly or outwardly, the pressure on the shaft 39 compressing the spring 41 is increased or reduced, respectively, and so is the pressure exerted by the spring 41 on the piston 42.

An oscillating motion is also transmitted to the piston 42 by an assembly that includes a motor 55 with an eccentric 56 connected by a driving rod and ball and socket joint 53 to the coupling arm 54 for oscillating the latter. The boss 37 of arm 54 fits upon the square cross section upper end 38 of the piston rod 39, and imparts oscillating movement of arm 54 to the piston 42. The piston rod 39 has a lower end portion 11 of square cross section upon which the piston 42 slides. Thus the latter can slide axially independently of its oscillating rotating movement as described hereinbefore. By imparting an oscillatory rotating movement to the pistons, the friction of the pistons along the cylinder walls is minimized and cannot substantially disturb the equilibrium between oil pressure and spring tension. When the piston is forced to undergo a simultaneous gliding movement in a rotational sense by the independent motor 55 the regulating action involving axial sliding of the piston is no longer influenced by friction.

In order to neutralize the frictional resistance against axial displacement of the piston rod 39, which might be caused by the catch 37, 38 required for rotating the piston, the rotational motion has been made oscillatory. On reversing the direction of oscillatory movement of the piston rod the square head 38 will then for a moment be free from the surface of the corresponding square hole in boss 37 and also the piston 42 will be free from the piston rod end 11.

The spring 12 acting on piston 13 is pressed down by means substantially corresponding to that described above in connection with piston 42, but the pressure on the cap 7 of piston rod 8 is here exerted by a rounded projection 6 at one end of a balance arm or lever 5. The lever 5 is swingable about the shaft 17 which is fixedly connected with the block 43. A return pressure adjusting motor (not shown) drives the coupling arm 16 of the lever 5 by means of a rod 15. The influence of the varying oil pressures above and below the piston 13 on the adjusting force is balanced out by the fact that a rounded projection 22 at the end of lever 5 remote from projection 6 is engaged by a cap 23 on a ball bearing carried by the upper end of a rod 24 extending from a piston 25 in chamber 18 between conduits 14 and 26. The oil pressures above pistons 13 and 25 are the same, as the upper parts of valve chambers 10a and 18 communicate with each other and the pressures below pistons 13 and 25 are also the same as the lower parts of the chambers 10a and 18 communicate through conduit 14. Therefore, only the pressure of the spring 12 on the piston 13 influences the regulation of the pressure of the return oil in chamber 10a.

The piston rods 24 and 8 have the same oscillatory rotating movement imparted thereto as the piston rod 39 by means of the rods 52 and 49, the ball and socket joints 50 and 47 and the coupling arms 51 and 48.

The embodiment described above with reference to FIGS. 1 and 2 operates as follows:

When electromagnet 1 is energized to hold valve 2 in its open position, for example, until ignition of the burner has commenced, the pumped oil entering chamber 44 of block 43 passes directly from chamber 44 through the bypass or short circuit 26' to the valve chamber 3 and through the open valve 2 to the return pipe 4 so that the pressure acting under piston 42 in chamber 44 does not attain a sufficient value to lift piston 42 and, therefore, the lower end of valve 30 remains seated in aperture 32 to prevent the flow of oil through pipe 46 to the sprayer or nozzle of the burner.

When electromagnet 1 is deenergized and thereby effects closing of valve 2, the pressure of oil supplied to chamber 44 builds up in the latter and acts upwardly against piston 42 to raise the latter against the force of spring 41. The initial upward movement of piston 42 permits corresponding upward movement of valve 30 under the influence of spring 31 so that the lower end of valve 30 opens aperture 32 and permits the flow of oil through the latter and through pipe 46 to the sprayer or nozzle of the burner.

The opening 27 of piston 42 and the needle valve at the upper end of valve 30 cooperate to control the pressure of the oil supplied through pipe 46 to the sprayer or nozzle of the oilburner. Thus, if the pressure of the oil in chamber 44 exceeds a value which is determined by the setting of screw 33 controlling the force exerted by spring 41, piston 42 moves further upward away from valve 30 while the upward movement of the latter is limited by engagement of its flange 29 with the stop 28. Thus, such further upward movement of piston 42 opens the opening 27 of piston 42 to permit oil to flow through the latter and through the apertures 42a at the upper end of the piston into the conduit 26 which communicates with the return pipe 4.

The excess oil from the sprayer or nozzle of the burner is returned to block 43 at the inlet 20 and passes the check valve 19 to act upwardly on the pistons 13 and 25 in chambers 10a and 18, respectively. At the same time, the pressure of oil in conduit 26 acts downwardly on both pistons 13 and 25. The spring 12 also acts downwardly on piston 13 to maintain the latter in a position where its bottom opening 9 is closed by the fixed needle valve 10, until the pressure in chamber 10a below piston 13 exceeds a value determined by the force exerted by spring 12 which is adjustable through rocking of the balance arm or lever 5 by the rod 15. When the pressure of oil in chamber 10a below piston 13 exceeds the predetermined value, piston 13 is raised against the force of spring 12 to open the opening 9 so that the oil returned from the sprayer or nozzle of the burner can then flow through opening 9 and through the apertures 13a at the top of piston 13 and then into conduit 26 to the return pipe 4.

From the above it will be apparent that the pressure of the oil supplied to the nozzle or sprayer of the oilburner is adjusted by varying the force exerted by spring 41 on piston 42, while the pressure of the excess oil returned from the nozzle or sprayer is varied by adjusting the force exerted by the spring 12 on piston 13. Further, it will be apparent that the pistons 13, 25 and 42 are continuously oscillated about their vertical axes within the respective valve chambers so that only sliding friction resists the axial displacements of the pistons, which sliding friction is substantially less than the static friction that would resist the axial displacements of the pistons were the latter not oscillated within their respective chambers. It is also to be noted that the transmission of oscillatory movement to the pistons 13 and 42, rather than rotary movement in a single direction, ensures that, during each reversal of the direction of turning of a piston, the normal clearance provided between the rod 11 of square cross-section and the corresponding square hole provided in the upper end of the piston 13 or 42 will substantially free such piston for axial displacement by reason of any imbalance between the oil pressures and spring forces then acting on the piston.

Referring now to FIGS. 3 to 7, inclusive, it will be seen that, in the embodiment of the invention there illustrated, the single block 143 is provided with valve chambers 103, 110a, 118' and 144 which respectively correspond to the valve chambers 3, 10a, 18 and 44 of the previously described embodiment, but which are arranged at the corners of a box-like formation, rather than being disposed in a row. Thus, in the embodiment now being described, chambers 110a and 118' are arranged side-by-side, as indicated in broken lines on FIG. 3, while chambers 103 and 144 are also arranged side-by-side, as indicated in broken lines on FIG. 6 and are disposed in back of the chambers 110a and 118', respectively.

Figure 7:
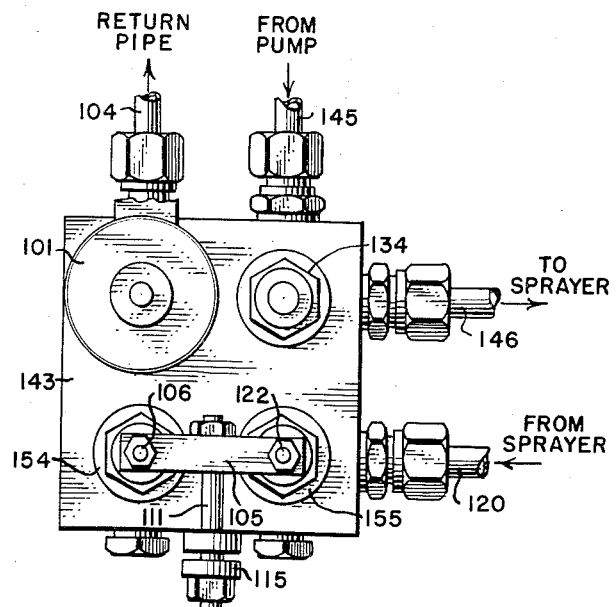
FIGURE 7 is a top plan view of the device of FIGURES 3-6.

Oil under pressure is supplied to the chamber 144 of block 143 from a pump (not shown) through the inlet pipe 145 (FIGS. 4 and 6). Further, the pumped oil flows from valve chamber 144 to the nozzle or sprayer of the oilburner through a pipe 146 (FIGS. 6 and 7) which appears only as an aperture in FIG. 4. The excess oil is returned from the nozzle or sprayer to the lower portion 121 of valve chamber 118′ by way of a pipe 120 (FIGS. 3 and 7) which appears only as an orifice in FIG. 4. The upper portion of valve chambers 110a, 118′ and 144 all communicate with a conduit 126 corresponding to the conduit 26 of FIG. 1, and which opens into the lower portion of valve chamber 103 below the seat of the valve 102 in the latter, and the lower portion of valve chamber 103, in turn, communicates with the return pipe 104 (FIGS. 5, 6 and 7). As shown in broken lines on FIG. 3, a conduit or passage 114, corresponding to the passage 14 of FIG. 1, extends through block 143 between the lower portions of valve chambers 110a and 118′, and further, as shown in broken lines on FIG. 6, a conduit or passage 126′ corresponding to the conduit 26′ of FIG. 1 extends through block 143 between the lower portion of valve chamber 144 and the upper portion of valve chamber 103.

The oil supplied from the pump to chamber 144 by way of pipe 145 acts upwardly in chamber 144 against the piston 142 which is urged downwardly by the spring 141 with a force that is adjustable by means of a set screw 133 screwed into a tapped bore of a cap nut 134 closing the top of the valve chamber 144 in block 143. When solenoid 101 is energized to open valve 102, the oil from the pump can pass directly through the bypass or short circuit conduit 126′ to the chamber 103 and, from the latter, through the open valve 102 into the return pipe 104 so that the pressure in chamber 144 cannot build up to the value necessary to effect lifting of piston 142. However, when solenoid 101 is deenergized and closes valve 102, the pumped oil lifts piston 142 so that spring 131 can also lift valve 128 and thereby open the lower seat 132 of valve 128 to permit the pumped oil to flow through lower seat 132 and pipe 146 to the sprayer or nozzle of the associated oilburner.

The excess oil from the sprayer or nozzle of the oilburner is returned through pipe 120 to the lower portion 121 of valve chamber 118′ and passes the check valve 119 to act upwardly on piston 125 in chamber 118′ and also to flow through the passage or conduit 114 into the lower portion of valve chamber 110a.

In chamber 110a, the returned excess oil acts upwardly against the piston 113 which is urged downwardly by the spring 112 bearing, at its upper end, against a disk 136 which is, in turn, pressed downwardly by a spindle or rod 108. The piston 125 in chamber 118′ bears against the lower end of a spindle or rod 124, and the upper ends of the rods 108 and 124 bear against the heads 166 and 122 (FIG. 3) of screws that extend adjustably through the opposite ends of a balance arm or lever 105 which is rockable on a shaft 117. An arm 115 is fixed to an end of shaft 117 and is suitably connected to a motor or the like (not shown) which is operated to effect adjustment of the pressure of the excess oil returned from the nozzle or sprayer of the oilburner. Thus, rocking of arm 115 and corresponding rocking of the balance arm or lever 105 serves to vertically adjust the spindle or rod 108 and thereby vary the force exerted by spring 112 downwardly against piston 113. When the pressure of the returned excess oil exceeds the predetermined value established by the force of spring 112, such oil pressure moves piston 113 upwardly to open the aperture 109 in the piston 113 which is normally closed by the fixed needle valve 110. Opening of the aperture 109 permits the returned excess oil to flow therethrough into the upper portion of valve chamber 110a and from the latter through passage or conduit 126 to the return pipe 104, thereby to correspondingly reduce the pressure of the returned or excess oil. Since the pressure of the returned excess oil acts upwardly against both pistons 113 and 125 and the rods or spindles 108 and 124 act against the opposite ends of balance arm 105, it will be apparent that a relatively small force needs to be exerted through arm 115 in order to affect adjustment of the spring force exerted by spring 112 to vary the pressure of the returned excess oil.

Reference to FIGS. 4 and 5 will show that the valve chambers 110a, 118′ and 144 have identical configurations, while the fourth valve chamber 103 differs from the initially identified valve chambers only in its middle portion, thereby facilitating machining of the block 123. Further, the variations between the several valve chambers necessary to permit the same to perform the various functions previously described herein are achieved merely by inserting therein exchangeable elements. It is also to be noted that, among these exchangeable elements, an important part in each of the chambers 110a, 118′ and 144 is uniform and therefore interchangeable. Thus, the valve chambers 110a, 118′ and 144 contain identical cylindrical linings 147, 148 and 149 which are held in place by related springs 156, 157 and 158. The lower ends of all of the valve chambers are closed by identical bottom cap nuts 150, 151, 152 and 153, and identical cap nuts 154 and 155 close the upper ends of the valve chambers 110a and 118′ and have the spindles or rods 108 and 124 respectively extending therethrough. The springs 112 and 141, the pistons 113 and 142, the valve seat bodies 159 and 160 associated with valve 128 and check valve 119, respectively, and the locking springs 161 and 162 holding such valve seating bodies in position may also be uniform.

The linings 147, 148 and 149 preferably have tapered lower ends, as at 164 on FIG. 5, so that the same may be easily inserted into the related valve chambers through the upper ends thereof, and each of the valve chambers containing a cylindrical lining is preferably provided with a sealing ring 166 received in an annular groove 165 formed in the wall of the valve chamber. The loosely inserted linings 147, 148 and 149 are each provided with a shoulder 167 at its upper end held against the bottom of a counterbore 169 at the top of the related valve chamber by means of the related spring 156, 157 or 158 engaged by the related cap nut 154, 134 or 155.

Although the embodiment of the invention illustrated in FIGS. 3 to 7, inclusive, does not have means for effecting the oscillatory movement of the pistons 113, 125 and 142 thereof, it will be apparent that a mechanism for effecting such oscillatory movement of the pistons may be provided in a manner similar to the mechanism previously described with respect to the embodiment of FIGS. 1 and 2.

Although illustrative embodiments of this invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What I claim is:

1. A pressure regulating device for oil burners comprising a single valve housing having a first bore therein, a first piston slidable in said first bore, said housing having an oil supply inlet opening into said first bore below said piston so that the pressure of oil supplied to said first bore urges said piston upwardly, said housing having an oil outlet opening from the bottom of said first bore and intended for supplying oil to an oil burner, valve means acted upon by said first piston to stop the flow of oil through said oil outlet in response to downward movement of sair first piston, first adjustable spring means urging said first piston downwardly to close said valve means and being overcome by a predetermined pressure of oil in said first bore which raises said first piston and thereby permits opening of said valve means, said housing having a second bore with a second piston slidable therein and a return oil inlet adapted to receive oil returned from an oil burner and communicating with said second bore below said second piston, said housing further having a return oil outlet communicating with said second bore above said piston, second adjustable spring means urging said second piston downwardly against the pressure of oil admitted to said second bore through said return oil inlet, said second piston having a passage extending therethrough, and a valve member in said second bore for closing said passage of the second piston when the latter is moved downwardly by said second spring means and being unseated from said passage to permit discharge of the returned oil through said return oil outlet when the pressure of said returned oil exceeds a predetermined value.

2. A pressure regulating device for oil burners as in claim 1; wherein said housing has a third bore with a third piston slidable therein and a duct connecting said second and third bores below said second and third pistons, and said return oil inlet opens into said third bore below said third piston and has a check valve interposed therein to permit flow of oil through said return oil inlet only in the direction into said third bore; and further comprising means communicating said return oil outlet with said third bore above said third piston, a balance arm pivotally mounted on said housing, a piston rod extending from said third piston and acting against one end of said balance arm, and means acted upon by the other end of said balance arm and controlling the force exerted by said second spring means so that said second spring means regulates the pressure of the returned oil independently of any differences between the oil pressures above and below said second piston.

3. A pressure regulating device for oil burners as in claim 2; further comprising interchangeable cylindrical liners in said first, second and third bores, each of said bores having an enlarged counterbore at its upper end defining a radial shoulder, a radial rim at the upper end of each liner adapted to seat on said shoulder, a cap nut screwed into said counterbore to close the upper end of the related bore, and a spring in each counterbore held by said cap nut against said rim to urge the latter against said shoulder, each liner having an externally tapered lower edge to facilitate the insertion of the liner into the related bore through said counterbore.

4. A pressure regulating device for oil burners as in claim 2; wherein said first, second and third bores are of uniform shape and have interchangeable cylindrical liners inserted therein.

5. A pressure regulating device for oil burners as in claim 1; wherein said valve means acted upon by the first piston includes a valve seat below said first piston between said first bore and said oil outlet, said first piston having a passage extending therethrough, a duct extending from said first bore above said first piston to said return oil outlet, a valve spindle movable in said first bore below said first piston and having valve elements at its opposite ends to engage said passage of the first piston and said valve seat, respectively, means in said first bore urging said valve spindle to move upwardly with said first piston, and means limiting the upward movement of said valve spindle so that said passage of the first piston is open only when the latter is raised beyond the limit of the upward movement of said valve spindle by an excessive pressure of oil supplied to said first bore.

6. A pressure regulating device for oil burners as in claim 1; wherein said housing further has a valve chamber communicating with said return oil outlet, and a short circuit duct communicating said first bore with said valve chamber; and further comprising an electromagnetically operated valve for closing the communication between said valve chamber and return oil outlet so that oil supplied to said first bore passes directly through said short circuit duct and valve chamber to said return oil outlet when said electromagnetically operated valve is open to prevent the build-up of pressure in said first bore for raising said first piston.

7. A pressure regulating device for oil burners as in claim 1; further comprising means imparting rotary oscillations to each of said pistons so as to reduce the frictional resistance to axial movement of each piston in the related bore.

8. A pressure regulating device for oil burners as in claim 7; wherein said means imparting rotary oscillations to each piston includes a piston rod, an axially slidable, rotatable coupling between each piston rod and the related piston, a reciprocable driving rod, motor means for reciprocating said driving rod, and a radial arm extending from each piston rod and pivotally connected to said driving rod so that said piston rods and the related pistons are oscillated in response to reciprocation of said driving rod.

9. A pressure regulating device for oil burners as in claim 8; wherein each of said spring means includes a compression coil spring abutting, at its opposite ends, against the related piston and piston rod, respectively, means for adjusting the axial position of said piston rod and thereby adjusting the force exerted by the related coil spring, and anti-friction bearing means between each piston rod and said means for adjusting the axial position of the latter.

References Cited in the file of this patent

UNITED STATES PATENTS

| | | |
|---|---|---|
| 1,753,662 | Merker | Apr. 8, 1930 |
| 1,980,478 | Frentzel | Nov. 13, 1934 |
| 2,036,489 | Murphy | Apr. 7, 1936 |
| 2,050,853 | Murphy | Aug. 11, 1936 |
| 2,415,750 | Melichar | Feb. 11, 1947 |

OTHER REFERENCES

Aircraft Engineering, Volume XXV of May 1953, pages 133–139.

"The Dowty Spill-Burner Fuel System." (Copy in Div. 19, 158–36.4GT 2.)